United States Patent [19]

Bonda

[11] Patent Number: 5,185,896
[45] Date of Patent: Feb. 16, 1993

[54] INFLATABLE MATTRESS
[76] Inventor: Jacob Z. Bonda, 10 Hazelnut, Irvine, Calif. 92714
[21] Appl. No.: 878,666
[22] Filed: May 4, 1992
[51] Int. Cl.⁵ .............................................. A47C 27/10
[52] U.S. Cl. ............................................. 5/118; 5/94; 5/455
[58] Field of Search ....................... 5/94, 118, 449, 455

[56] References Cited
U.S. PATENT DOCUMENTS

| 2,648,072 | 8/1953 | De Blieux | 5/94 |
| 3,110,520 | 11/1963 | Herding | 297/452 |
| 3,143,746 | 8/1964 | Spear | 5/94 |
| 3,648,306 | 3/1972 | Auerbach | 5/118 X |
| 3,696,449 | 10/1972 | Smith | 5/118 X |
| 4,924,541 | 5/1990 | Inagaki | 5/468 |
| 4,965,899 | 10/1990 | Sekido et al. | 5/453 |

FOREIGN PATENT DOCUMENTS 2457076 6/1976 Fed. Rep. of Germany ............ 5/94

Primary Examiner—Michael F. Trettel

[57] ABSTRACT

An apparatus is provided for increasing the useful surface area of a rear seat of an automobile. A first inflatable cell of approximately rectangular block shape fits between the front and rear seats of the automobile. The cell has an upwardly facing top surface for supporting a load at about the level of the seats, and a downwardly facing bottom surface for supporting the cell on a floor of the automobile, or the like. The bottom surface conforms to the shape of the floor and defines a concave portion for accepting a drive shaft hump extending upwardly from the floor. At least one second inflatable cell extends downwardly from the concave portion so that with the first cell and the at least one second cell inflated, the apparatus is caused to fit conformably to the floor and drive shaft hump. At least one third inflatable cell is attached to the first cell so that with the first cell and the at least one third cell inflated, the apparatus is expanded to fit tightly between a left side and a right side of the automobile. At least one fourth inflatable cell is attached to the first cell so that with the first cell and the at least one fourth cell inflated, the apparatus is expanded to fit tightly between the seats of the automobile. Preferably, each cell has an inflation valve such that all cells may be inflated to pressures independently.

3 Claims, 1 Drawing Sheet

INFLATABLE MATTRESS

FIELD OF THE INVENTION

This invention relates generally to inflatable mattresses, and, more particularly, to an inflatable mattress for fitting between two seats of an automobile.

BACKGROUND OF THE INVENTION

Almost everyone has had to sleep or recline in an automobile at some time, and most people generally agree that such an experience is uncomfortable and unpleasant in a standard automobile. Typically, even a relatively large automotive back seat is not wide enough to be considered comfortable for sleeping, even for one person. Two people have a considerably more difficult time sleeping comfortably on the back seat of an automobile, and one such person will usually find himself on the automobile floor by the end of the night. Such automobile floors tend to have a large protrusion extending up from the floor along the central axis of the automobile for accommodating the drive shaft of the automobile, making the floor of the automobile an even more uncomfortable place to recline or sleep.

Clearly, an apparatus is needed that would increase the usable surface area in an automobile for supporting a reclining person. Inflatable rafts, mattresses, and cushions of the prior art are not well suited for increasing the usable surface area in such an automobile since they are not generally designed to conform to the floor of an automobile, around the drive shaft hump. Further, such prior art inflatable mattresses, and the like, are not typically adjustable to various sizes of automotive back seat compartments. Non-inflatable prior art devices that could be used between the seats of an automobile to increase the usable surface area of the back seat are ill-suited for this task since they do not easily deflate for convenient storage, say, in the trunk or under a seat. The present invention fulfills these needs and provides further related advantages.

SUMMARY OF THE INVENTION

The present invention is an apparatus for increasing the useful reclining surface area in an automobile, such as would be used to support a reclining person or other load. At least one first inflatable cell of approximately rectangular block shape fits between the front and rear seats of the automobile. The cell has an upwardly facing top surface for supporting the reclining figure at about the level of the seats, and a downwardly facing bottom surface for supporting the cell on a floor of the automobile, or the like, between front and rear seats of the automobile. The bottom surface conforms to the shape of the floor and defines a concave portion for accepting a drive shaft hump extending upwardly from the floor.

At least one second inflatable cell extends downwardly from the concave portion so that with the first cell and the at least one second cell inflated, the apparatus is caused to fit conformably to the floor and drive shaft hump. Preferably, at least one third inflatable cell is attached to the first cell so that with the first cell and the at least one third cell inflated, the apparatus is expanded to fit tightly between a left side and a right side of the automobile. At least one fourth inflatable cell is preferably attached to the first cell so that with the first cell and the at least one fourth cell inflated, the apparatus is expanded to fit tightly between the front and rear seats of the automobile.

Preferably, each cell has an inflation valve such that all cells may be inflated to pressures independently. In operation, the deflated apparatus is positioned along the floor of the automobile, and the first inflatable cell is filled with air or other fluid at the inflational valve. The other cells are inflated in turn until the apparatus has tightly conformed to the shape of the automobile floor and seats. A person may then recline upon the apparatus.

The present invention increases the usable surface area in an automobile for supporting a reclining person, or the like. The present invention, moreover, conforms to the floor of any automobile and is adjustable to any size of drive shaft hump. Further, the present invention is adjustable to various sizes of automotive back seat compartments, and is easily deflated for convenient storage. The present invention is relatively easy to manufacture and use. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
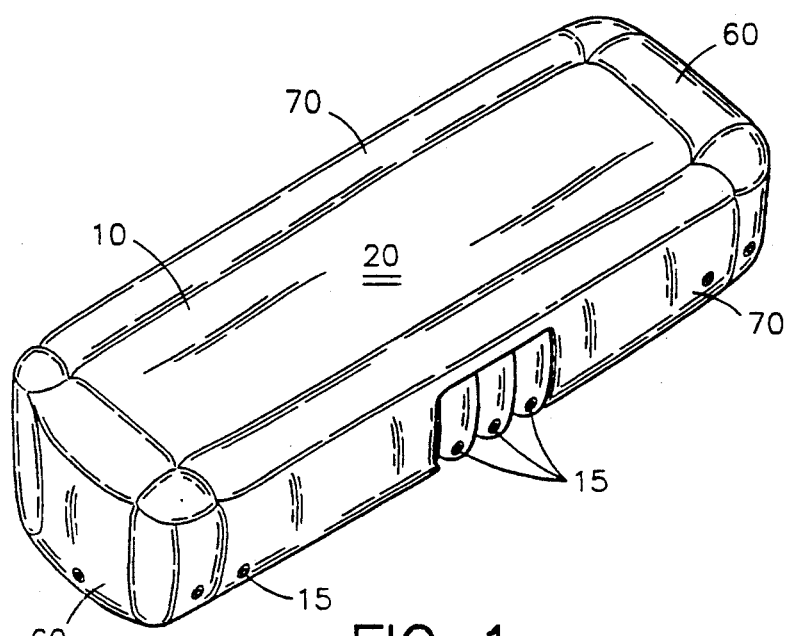
FIG. 1 is a perspective illustration of the invention, illustrating a top surface area of the invention.
Figure 2:
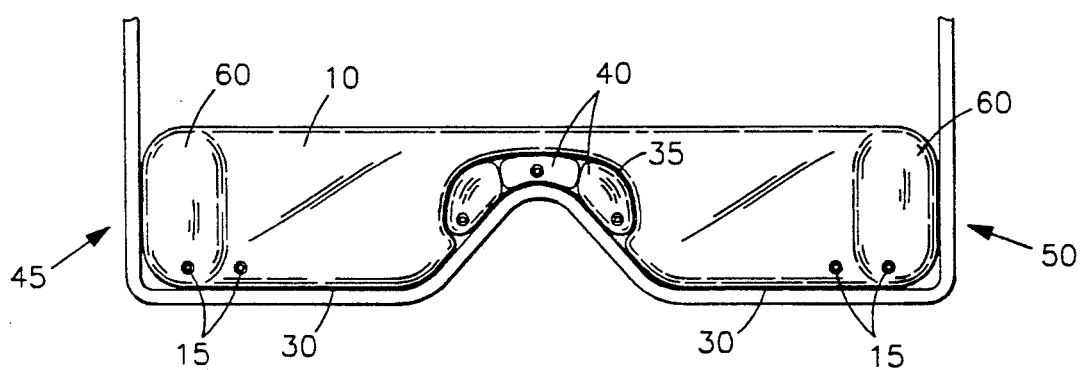
FIG. 2 is a front elevational view of the invention, illustrating a concave portion for accepting a drive shaft hump of an automobile.
Figure 3:
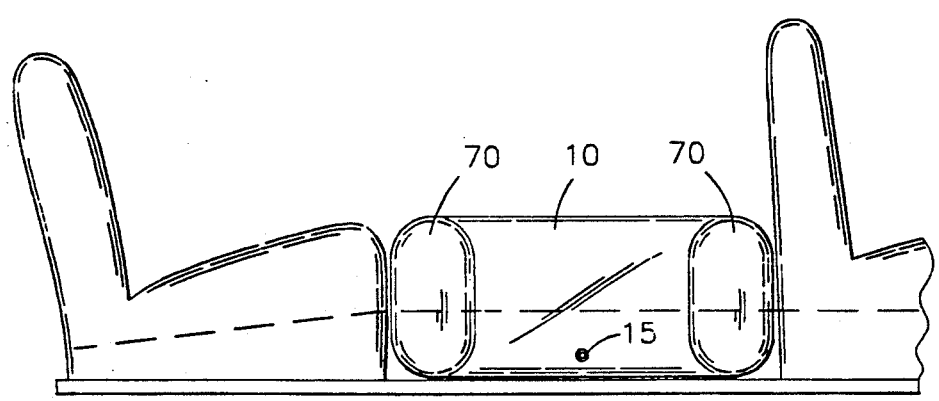
FIG. 3 is a right side elevational view of the invention, illustrating the invention fitting conformably between seats of the automobile.

FIG. 1 shows an apparatus for increasing the useful surface area in an automobile, such as would be used to support a reclining figure or other load (not shown). At least one first inflatable cell 10 of approximately rectangular block shape fits between the front and rear seats of the automobile (FIG. 3). The cell 10 has an upwardly facing top surface 20 for supporting the reclining figure at about the height of the top surface of the seats, and a downwardly facing bottom surface 30 for supporting the cell on a floor of the automobile. The bottom surface 30 conforms to the shape of the floor and defines a concave portion 35 for accepting a drive shaft hump extending upwardly from the floor (FIG. 2).

At least one second inflatable cell 40 extends downwardly from the concave portion 35 so that with the first cell 10 and the at least one second cell 40 inflated, the apparatus is caused to fit conformably to the floor and drive shaft hump. Preferably, at least one third inflatable cell 60 is attached to the first cell 10 so that with the first cell 10 and the at least one third cell 60 inflated, the apparatus is expanded to fit tightly between a left side 45 and a right side 50 of the automobile (FIG. 2). At least one fourth inflatable cell 70 is preferably attached to the first cell 10 so that with the first cell 10 and the at least one fourth cell 70 inflated, the apparatus is expanded to fit tightly between the seats of the automobile (FIG. 3).

Preferably, each cell 10, 40, 60, 70 has an inflation valve 15 such that all cells 10, 40, 60, 70 may be inflated to pressures that are independent of each other. Each valve 15 is capable of being pressed flush with the surface of each cell 10, 40, 60, 70 so as not to protrude from the cell 10, 40, 60, 70 when not in use. Each cell 10, 40, 60, 70 is preferably manufactured from a strong flexible material that can form an air or water tight enclosure, and be inflated to a pressure sufficient to support a reclining person, or the like. Various sheet materials, such as vinyl, nylon, or multiple layered materials may be used to manufacture each cell 10, 40, 60, 70.

In operation, the deflated apparatus is positioned along the floor of the automobile, and the first inflatable cell 10 is filled with air or other fluid at the inflational valve 15 of the first cell 10. Filling of the cell 10 with air can be accomplished with a manual air pump or a small air compressor. Alternatively, the cell 10 may be inflated by mouth before the apparatus is positioned along the floor of the automobile. The other cells 40, 60, 70 are then inflated in turn until the apparatus has tightly conformed to the shape of the automobile floor and seats. A person may then recline upon the apparatus comfortably, using the rear seat plus the apparatus as a contiguous reclining surface.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. An apparatus for increasing the surface area in an automobile that could be used for a reclining figure comprising:

at least one first inflatable cell of approximately rectangular block shape for fitting between the seats of an automobile, the cell having a horizontal upwardly facing top surface for supporting the reclining figure at about the level of the seats, and a downwardly facing bottom surface for supporting the cell on a floor of the automobile, the bottom surface conforming to the shape of the floor and defining a concave portion for accepting a drive shaft hump extending upwardly from the floor; and at least one second inflatable cell extending downwardly from the concave portion so that with the first cell and the at least one second cell inflated the apparatus is caused to fit conformably to the floor and drive shaft hump.

2. The apparatus of claim 1 further including at least one third inflatable cell attached to the first cell so that with the first and the at least third cells inflated, the apparatus is expandable to fit tightly between a left and a right side of the automobile.

3. The apparatus of claim 1 further including at least one fourth inflatable cell attached to the first cell so that with the first and the at least one fourth cells inflated, the apparatus is expandable to fit tightly between the seats.

* * * * *